United States Patent [19]

von der Ohe

[11] 3,740,473

[45] June 19, 1973

[54] TELEVISION RECEIVER HAVING A PHASE COMPARISON CIRCUIT AND A GAIN CONTROL CIRCUIT

[75] Inventor: Wilfried von der Ohe, Ludersen, Germany

[73] Assignee: Licentia Patent Verwaltungs GmbH, Frankfurt, Germany

[22] Filed: Sept. 16, 1970

[21] Appl. No.: 72,666

[30] Foreign Application Priority Data

Sept. 19, 1969 Germany .................. P 19 47 524.2
Jan. 28, 1970 Germany .................. P 20 03 655.9

[52] U.S. Cl. .............................................. 178/7.5 R
[51] Int. Cl. .............................................. H04n 5/20
[58] Field of Search ............... 178/7.3 DC, 7.5 DC, 178/5.4 SY, 5.4 AC, 69.5 CB, 7.3 R, 7.5 R, 7.5 S

[56] References Cited

UNITED STATES PATENTS

| | | | |
|---|---|---|---|
| 3,223,942 | 12/1965 | Smealens | 331/8 |
| 2,876,382 | 3/1959 | Szyklai | 315/27 R |
| 3,024,305 | 3/1962 | Wolfe | 178/69.5 CB |
| 3,294,904 | 12/1966 | Perciual | 178/7.5 DC |

*Primary Examiner*—Richard Murray
*Attorney*—Spencer & Kaye

[57] ABSTRACT

In a television receiver, the line frequency keying pulses applied to the respective control electrodes of the phase-frequency comparison circuit for the line synchronism and/or the video gain control circuit, are produced in an AND circuit to whose inputs are applied the line sync pulse and a line frequency pulse generated in the horizontal sweep circuit, i.e., the line flyback pulse.

15 Claims, 4 Drawing Figures

Inventor:
Wilfried Von Der Ohe

BY Spencer & Kaye
ATTORNEYS

Inventor:
Wilfried Von Der Ohe

BY Spencer & Kaye
ATTORNEYS.

TELEVISION RECEIVER HAVING A PHASE COMPARISON CIRCUIT AND A GAIN CONTROL CIRCUIT

BACKGROUND OF THE INVENTION

The present invention relates to television receivers of the type having a keyed phase-frequency comparison circuit for controlling the line synchronization and a keyed gain control circuit. In particular, this invention is related to an improved circuit arrangement for providing the line frequency keying pulses for the gain control and phase-frequency comparison circuits of such a television receiver.

In a television receiver the horizontal sweep is synchronized by means of a comparison circuit which produces a control voltage for the synchronization of the line oscillator by means of a phase comparison of the line synchronizing pulse in the video signal with the line flyback pulse generated in the horizontal sweep circuit. Such phase comparison circuits generally also operate as frequency comparison circuits and hence may be generally designated as phase-frequency comparison circuits. In a known comparison circuit of this type ( U.S. Pat. No. 2,876,382) a comparison pulse having an oblique or sloping edge, which pulse may be derived from either the line flyback pulse or from the line sync pulse, is fed through a capacitor to a point in the comparison circuit which may be grounded though a transistor and which furnishes the control voltage via an RC filter member. The transistor is controlled by a keying pulse to be periodically conductive during the flyback time. This keying pulse may be the line sync pulse or the flyback pulse depending on which was utilized to derive the comparison pulse.

A television receiver also generally comprises a keyed gain control circuit to which is fed, on the one hand, the video signal with its direct voltage component and, on the other hand, a keying pulse. The keying pulse for this circuit is generally supplied in the form of a line flyback pulse which is derived from the line transformer.

A plurality of circuit elements are thus required to generate the keying pulse for the phase comparison circuit and the keying pulse for the gain control circuit. Additionally, the prior art arrangements for keying these circuits tend to be subject to erroneous keying as the result of interferences.

SUMMARY OF THE INVENTION

It is the object of the present invention to reduce the circuitry required to produce the keying pulses for the phase comparison circuit and for the keyed gain control circuit.

It is a further effect of the present invention to provide a circuit arrangement for keying the phase comparison circuit and/or the gain control circuit which will render these circuits less sensitive to interference or erroneous voltages.

The above objects are achieved by the present invention in that in a television receiver having a phase-frequency comparison circuit for the line synchronization which is keyed at a control electrode by a line frequency keying pulse and a gain control circuit keyed at its control electrode by a line frequency keying pulse, the required line frequency keying pulse is produced by connecting the control electrode of the phase-frequency comparison circuit and/or of the gain control circuit to the output of an AND circuit to whose inputs are applied the line sync pulse and a line frequency pulse generated in the horizontal sweep circuit (line flyback pulse).

Thus, the present invention holds the amount of circuitry required at a minimum because the same keying pulse is employed for both the phase-frequency comparison and the gain control circuits. Additionally, since this keying pulse is generated in an AND circuit from the line flyback pulse and the line sync pulse, particular advantages, particularly with respect to the insensitivity to interferences, result for the phase-frequency comparison as well as for the gain control circuits. The circuit arrangement according to the invention also offers advantages if only the phase-frequency comparison circuit is controlled in the described manner.

DESCRIPTION OF THE PREFERRED EMBODIMENTS

Figure 1:
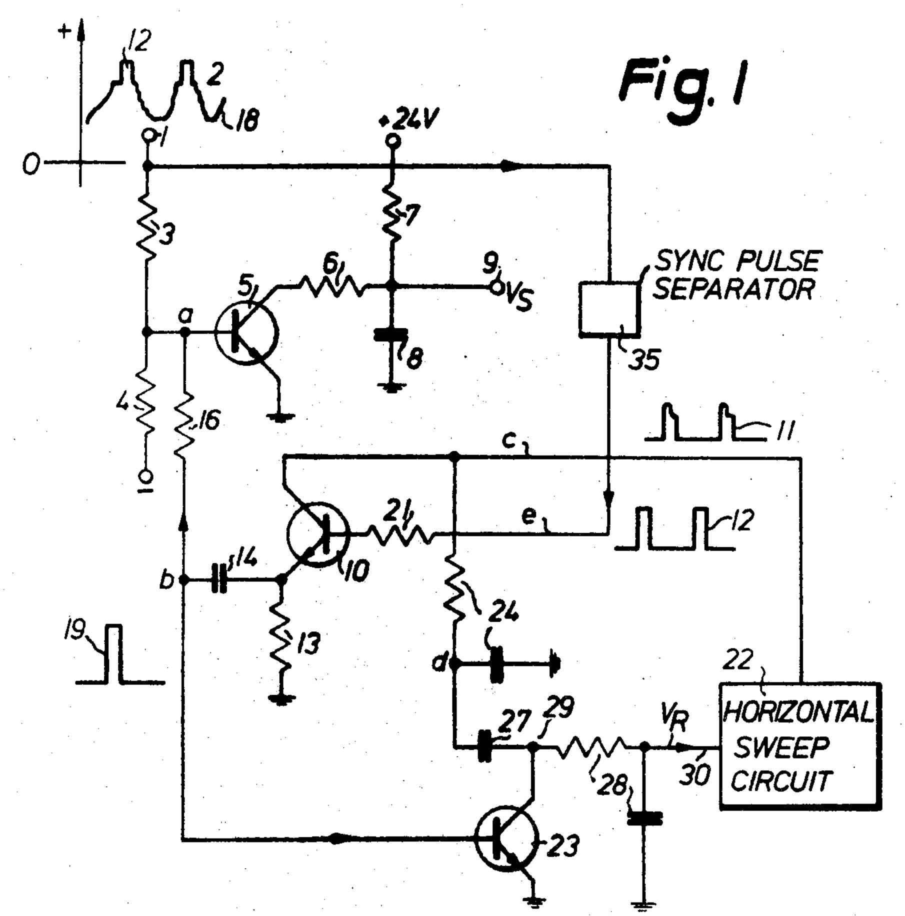
FIG. 1 is a schematic circuit diagram of one embodiment of the present invention.
Figure 2:
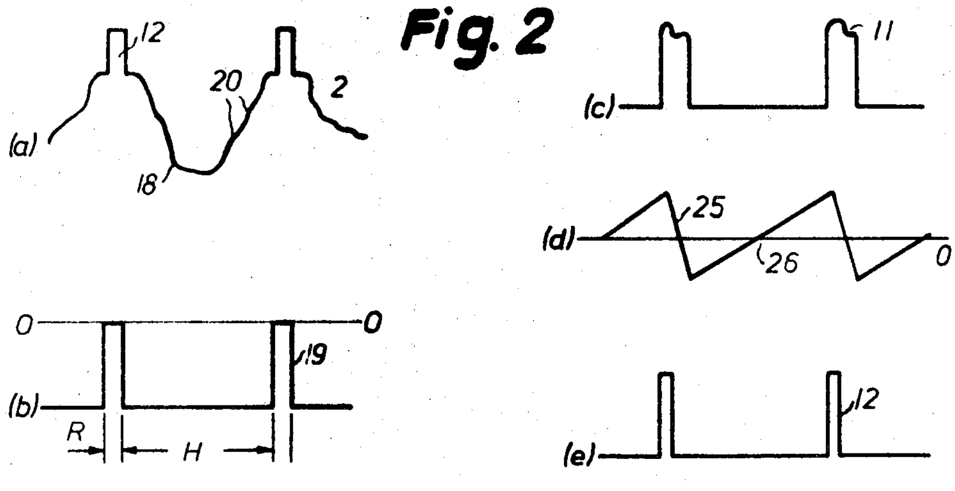
FIG. 2 illustrates the voltage wave forms utilized to explain the circuit of FIG. 1.
Figure 3:
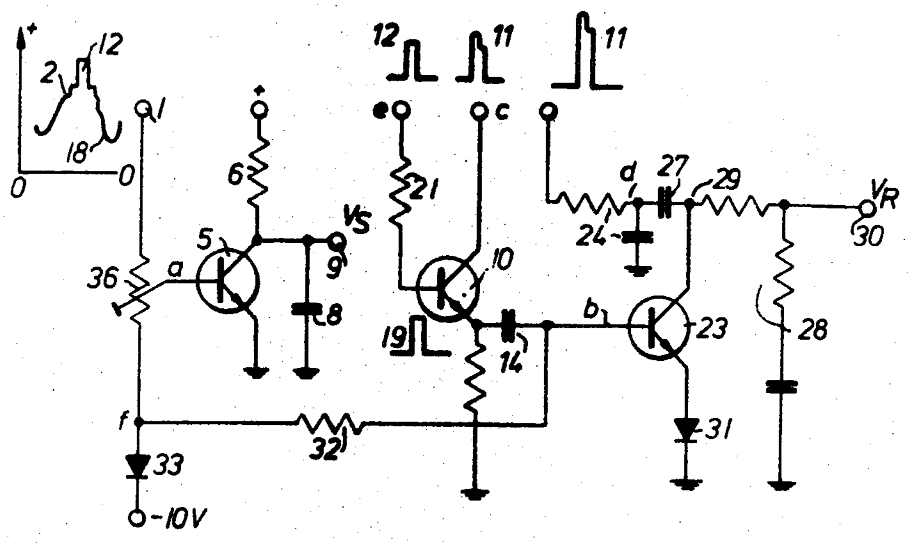
FIG. 3 is a schematic circuit diagram of a modification of the circuit according to FIG. 1.
Figure 4:
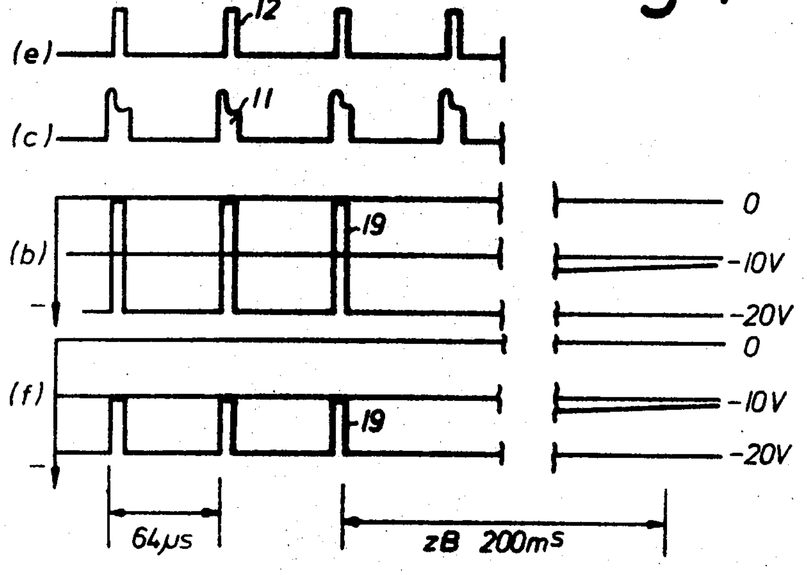
FIG. 4 illustrates the voltage wave forms utilized to explain the circuit of FIG. 3.

In FIGS. 1 and 3 the same reference numerals are utilized to indicate the same elements and the lower-case letters *a–f* indicate at which points in the circuits of FIGS. 1, 3 the voltages according to FIGS. 2,4, respectively appear.

Referring now to FIG. 1, there is shown a terminal 1 to which is applied the video signal 2, which is superimposed on a positive direct voltage. The signal appearing at terminal 1 is fed via a voltage divider consisting of resistors 3 and 4 to the control electrode of a gain control circuit, which in the illustrated embodiment is the base of a transistor 5,whose collector is connected to a source of positive operating voltage (+24v) via resistors 6,7 and whose emitter is connected to ground. A storage capacitor 8 is connected to the output terminal 9 which capacitor 8 together with resistors 6,7 forms an integrating circuit which furnishes a control voltage $V_S$ for the automatic gain control at the terminal 9. The gain control circuit is keyed by means of a keying pulse 19 fed to the base of the transistor 5 via a resistor 16.

To synchronize the horizontal sweep circuit 22, a phase-frequency comparison stage having a transistor 23 serving as a switch is provided. In the phase-frequency comparison circuit, a comparison pulse is derived in the integrating member 24 from the line flyback pulse 11 generated in the sweep circuit 22, which comparison pulse, as shown in FIG. 2(*d*), has a short edge on ramp 25 and a long edge 26. The comparison pulse is fed to the collector of transistor 23 via a charging capacitor 27 to furnish a control voltage $V_R$ at the terminal 30 for the synchronization of the horizontal sweep circuit 22 via a filter member 28. Transistor 23 is controlled at its base i.e., the control electrode of the comparison circuit, by a line frequency keying pulse 19 to be periodically conductive and thus periodically connect circuit point 29 to ground in the case for positive voltage values for the comparison pulse 25,26

[FIG. 2(*d*)]. With negative voltage values for the comparison pulse, the collector-base path of transistor 23 is operated as a controlled diode which becomes conductive for negative voltages at the collector during keying pulse 19, i.e., with a low base voltage at transistor 23, and thus also connects the negative collector voltages to ground. Due to the high negative voltage at the base during the line sweep period H[FIG. 2(*b*)], which must be greater than the peak value of the comparison pulse, the collector-base diode of transistor 23 is blocked again. The phase comparison circuit described is disclosed in U.S. Pat. No. 2,876,382.

The line frequency keying pulse for transistor 5 (gain control) and for transistor 23 (phase-frequency comparison) is generated, according to the present invention, in an AND circuit. This AND circuit comprises a transistor 10 to whose base is applied the line sync pulses 12, which are separated from the video signal 2 in a separator stage 35 in a well known manner, and to whose collector is applied the line flyback pulses 11 from the horizontal sweep circuit 22. A line frequency keying pulse 19 is generated across resistor 13 in the emitter circuit of transistor 10 only when a line flyback pulse 11 and a line sync pulse 12 are simultaneously applied to the respective electrodes of transistor 10. The generated keying pulse is connected to the bases of transistors 5 and 23 via a series capacitor 14.

Turning now to the operation of the circuit of FIG. 1, the operation of the gain control circuit will initially be considered. The video signal 2 present at the base of transistor 5 is adjusted in the closed control loop of the gain control in such a manner with respect to the direct voltage, that the current flowing through transistor 5 is determined by the amplitude of the line sync pulses 12. The picture component 18 of video signal 2 has no influence on the transistor 5 since it lies in the blocking range of the base-emitter diode. The collector current flowing through transistor 5 reduces the charge at capacitor 8 and produces a control voltage at terminal 9 which is dependent on the amplitude of the line sync pulses 12. In this manner the gain control circuit generates a control voltage immediately after it is switched on, even in the absence of keying pulses 19, so that overcontrol and switch-on hum are avoided. The advantage of a keyed control for the gain control circuit is not present at first. As will be explained below, however, it will become apparent after warm up and synchronization of the line end stage of the sweep circuit 22.

When the line end stage of the sweep circuit 22 has become operative and is synchronized, the line flyback pulses 11 appear in phase with the sync pulses 12 and produce the positively directed keying pulse 19. The clamping circuit consisting of capacitor 14 and the base-emitter diode of transistor 23 places the most positive portion of pulse 19 at ground potential. Since during the line flyback period R the base of transistor 5 is at a voltage approximately in the order of magnitude of the ground potential anyhow, pulse 19 has practically no influence on the operation of transistor 5 during the flyback period R so that the generation of the control voltage remains unchanged. Clamping of pulses 19, however, causes a negative voltage to reach the base of transistor 5 during the sweep period H which blocks transistor 5. This insures that interferences 20 in the video signal 2 can no longer have any influence on the control voltage at terminal 9 during the line sweep period H and the advantage of the keyed gain control has been realized. The amplitude of pulse 19 is so dimensioned that even higher interference peaks 20 will not control transistor 5 to be conductive.

The line frequency keying pulse 19 is also used to control transistor 23. Thus, the AND circuit with transistor 10, in addition to the already described advantages for the gain control circuit and the reduction in circuitry since only one keying pulse is used, has the following advantages for the phase-frequency control circuit. With the general phase-frequency comparison circuit, keying the circuit during the time that the oblique edge 26 of comparison pulse *d* (FIG. 2) is present would furnish a wrongly directed control voltage $V_R$. However, since as a result of the AND circuit the keying pulse 19 can appear only during the time that a flyback pulse 11 is present, the edge or ramp 26 is made ineffective and thus an undesirable pulse comparison is not possible during the time the edge 26 of the pulse is present at point 29. Moreover, interfering pulses are substantially suppressed because transistor 10 emits an output voltage only when a pulse appears simultaneously at the base and the collector. This will, as a practical matter, almost never occur with interfering pulses since no interfering pulses come from the line sweep circuit 22. Even when the line sweep circuit 22 has not yet been synchronized, a coincidence between pulses 11 and 12 occurs at least at times so that the keying pulses 19 appear from time to time and can initiate the phase-frequency comparison.

In the modification of the circuit according to FIG. 3, instead of the input network for the control electrode of the gain control circuit shown in FIG. 1, the input network now comprises a variable resistance 36, whose moveable arm is connected to the base of transistor 5 and whose ends are respectively connected to the video signal input terminal 1 and, via a diode 33, to a source of bias potential,−10V in the illustrated circuit. The output of the AND circuit, taken at point *b* in the circuit, is connected to the control electrode of the gain control circuit, i.e., the base of transistor 5, via a resistance 32 connected to the junction of the resistance 36 and the diode 33, i.e., point *f*. With this circuit arrangement, when the keying pulse 19 is present at the emitter of transistor 10, due to the clamping circuit formed by capacitor 14 and the base-emitter path of transistor 23, the keying pulse takes up the position at point *b* which is illustrated in FIG. 4(*b*), i.e., it is biased by the base-emitter diode of transistor 23 approximately to the voltage 0 V. Thus transistor 23 is controlled in the desired manner to be conductive during the line flyback period R. Between two keying pulses 19 a voltage of −20 V (amplitude of the keying pulse) is present at point *b*, which voltage effects blocking of transistor 23. Keying pulse 19 also appears at point *f*. However, at point *f* the pulse 19 is limited to −10V by the action of diode 33, i.e., it is cut off at this voltage because the voltage at point *f* can not become any more positive than −10V due to the effect of diode 33. At point *f* therefore the keying pulse 19 appears as shown in FIG. 2(*f*), and a pulse-shaped voltage of −10V appears across resistor 32. Point *f* is thus at −10V during the duration of the keying pulse 19, i.e., during the period that the gain control circuit is keyed, which is the bias required at point *f* for the generation of a proper control voltage $V_S$. Between two keying pulses 19, i.e., during the sweep period, point *f* has a voltage of −20V as a result of the diode 33 being blocked during the sweep period H. This circuit arrangement thus causes the keying pulse 19 to be at different voltage values at points *b* and *f* (approximately 0 V and −10 V respectively).

Turning now to the situation where no keying pulse 19 is present, e.g., because no flyback pulses 11 are present as yet or because the horizontal sweep circuit 22 is not synchronized, after the first missing keying pulse 19 or prior to the generation of any keying pulses 19, the voltage at point *b* as well as at point *f* will assume a value of −20V. With a time constant determined by capacitor 14 to be large compared to the time duration of a line, the voltage at point *f* changes in the direction of −10 V, which is reached, for example, after a period of 200 ms. The voltage at point *f*, however, can not become any more positive than − 10V due to the effect of diode 33, and thus in the stationary state, the voltage at point *f* approaches −10V. It can be seen that this is the same bias which is at point *f* during the line flyback period R when a keying pulse 19 is present. The gain control circuit can thus again operate with the correct bias when a keying pulse 19 is missing and can furnish the control voltage $V_s$ required for the correct picture contrast. The bias of −10 V appearing at point *f* also becomes fully effective at point *b* via resistor 32 because this direct voltage is not discharged via capacitor 14, and the base emitter path of transistor 23 thus remains blocked. This bias of −10 V at point *b* now effects proper blocking of transistor 23 for all values of the alternating voltage appearing at the collector of transistor 23. This is important so that the transistor 23 is not controlled to be conductive by the alternating voltage appearing at the collector which would falsify the control voltage $V_R$ appearing at terminal 30 when a keying pulse is missing and thus the frequency of the line oscillator of the sweep circuit 22. The control voltage $V_R$ is thus maintained, as desired, for as long a time as possible corresponding to the discharging time constant after a keying pulse 19 is missing. Without this blocking voltage, the negative component of the comparison pulse appearing at the collector of transistor 23 would collapse and would lead to a strong, undesired frequency shift of the line oscillator of the sweep circuit 22. A diode 31 connected between the emitter of the transistor 23 and ground serves to protect transistor 23 against too high a blocking voltage at the base-emitter diode.

Thus, the circuit according to FIG. 3 produces a properly remaining blocking of switching transistor 23 when a keying pulse is missing, keying of the gain control transistor 5 when a keying pulse is present and identical bias conditions for transistor 5 for the control voltage generation whether a keying pulse is present or not.

A circuit according to FIG. 3, which has been successful in practice, had the following values:

capacitor 14: 10 μF
resistor 32: 2 kiloohm
resistor 36: 20 kiloohm

It will be understood that the above description of the present invention is susceptible to various modifications, changes and adaptations, and the same are intended to be comprehended within the meaning and range of equivalents of the appended claims.

I claim:

1. In a television receiver having a phase-frequency comparison circuit means, which is keyed at a control electrode thereof by a line frequency keying pulse, for providing a phase-frequency comparison between the line sync and line flyback pulses to produce a control voltage to synchronize the horizontal sweep circuit, and a gain control circuit for the video signal which by a line frequency keying pulse, for providing a phase-frequency comparison between the line sync and line flyback pulses to produce a control voltage to synchronize the horizontal sweep circuit, and a gain control circuit for the video signal which is keyed at a control electrode thereof by a line frequency keying pulse, the improvement comprising: AND circuit means for producing a line frequency keying pulse, means for applying the line sync pulses in the video signal and the line flyback pulses generated in the horizontal sweep circuit to the respective inputs of said AND circuit, and means for connecting the output of said AND circuit to at least the one of said control electrodes belonging to said gain control circuit, said output of said AND circuit being connected to a point of the input network for said control electrode of said gain control circuit to which is connected a source of bias potential via a diode, said diode limiting the value of the line frequency keying pulse to the value of the bias voltage.

2. The apparatus as defined in claim 1 wherein said phase-frequency comparison circuit includes a switching transistor whose base constitutes the control electrode for said comparison circuit and whose emitter-collector path is connected between ground and a point in said comparison circuit to which is applied a comparison pulse derived by the integration of the line flyback pulse from the horizontal sweep circuit.

3. The apparatus as defined in claim 1 wherein said AND circuit means includes a transistor to whose collector is applied the line flyback pulse, to whose base is applied the line sync pulse and whose emitter constitutes said output.

4. The apparatus as defined in claim 3 wherein said means for connecting the output of said AND circuit includes a capacitor connected in series with the output of said AND circuit and the connected control electrodes of said phase-frequency comparison circuit and said gain control circuit.

5. The apparatus as defined in claim 1 wherein said gain control circuit includes a storage capacitor connected to its output, and wherein said control electrode of said gain control circuit is biased so that said storage capacitor stores a value proportional to the voltage of the line sync pulses in the video signal applied to said gain circuit control electrode,whereby a gain control voltage is produced even when a keying pulse is missing.

6. The apparatus as defined in claim 1 wherein the output of said AND circuit is connected to a point of the input network for said control electrode of said gain control circuit to which is connected a source of bias potential via a diode, said diode limiting the value of the line frequency keying pulse to the value of the bias voltage.

7. The apparatus as defined in claim 6 wherein said control electrode of said phase-frequency comparison circuit comprises the base of a switching transistor for connecting to ground a point in said phase-frequency comparison circuit to which is applied a comparison pulse derived from the line flyback pulse from the horizontal sweep circuit, and wherein the output of said AND circuit is connected to said base of said switching transistor via a capacitor and to said point of the input network for said control electrode of the gain control circuit via said capacitor and a series resistor.

8. The apparatus as defined in claim 7 wherein the bias voltage presented at said point of the input network is such that it effects a continuous blocking of said switching transistor in the absence of a keying pulse.

9. The apparatus as defined in claim 7 wherein the recharging time constant of said capacitor which becomes effective in the absence of a keying pulse is large compared with the time duration of a line.

10. The apparatus as defined in claim 6 wherein said diode is controlled in the blocking direction by the pulse voltage value between two keying pulses.

11. In a television receiver having a phase-frequency comparison circuit means, which is keyed at a control electrode thereof is keyed at a control electrode thereof by a line frequency keying pulse, the improvement comprising: AND circuit means for producing a line frequency keying pulse, means for applying the line sync pulses in the video signal and the line flyback pulses generated in the horizontal sweep circuit to the respective inputs of said AND circuit, and means for connecting the output of said AND circuit to the respective control electrodes of both said phase-frequency comparison circuit and said gain control circuit.

12. The apparatus as defined in claim 11 wherein said control electrode of said phase-frequency comparison circuit comprises the base of a switching transistor for connecting to ground a point in said phase-frequency comparison circuit to which is applied a comparison pulse derived from the line flyback pulse from the horizontal sweep circuit, and wherein the output of said AND circuit is connected to said base of said switching transistor via a capacitor and to said point of the input network for said control electrode of the gain control circuit via said capacitor and a series resistor.

13. The apparatus as defined in claim 12 wherein the bias voltage presented at said point of the input network is such that it effects a continuous blocking of said switching transistor in the absence of a keying pulse.

14. The apparatus as defined in claim 12 wherein the recharging time constant of said capacitor which becomes effective in the absence of a keying pulse is large compared with the time duration of a line.

15. The apparatus as defined in claim 11 wherein said diode is controlled in the blocking direction by the pulse voltage value between two keying pulses.

* * * * *